US005320898A

United States Patent [19]

Yoshida et al.

[11] Patent Number: 5,320,898

[45] Date of Patent: Jun. 14, 1994

[54] PAPER SUITABLE FOR INK FUSION TRANSFER TYPE THERMAL PRINTER AND COPIERS, AND A MANUFACTURING METHOD THEREOF

[75] Inventors: Yoshio Yoshida, Shinjuku; Masao Matsukawa, Chiyoda; Yoshihiro Kuroyama; Teruhisa Shimada, both of Shinjuku, all of Japan

[73] Assignee: Sanyo-Kokusaku Pulp Co., Ltd., Tokyo, Japan

[21] Appl. No.: 32,593

[22] Filed: Mar. 17, 1993

[51] Int. Cl.[5] .................................... B32B 9/00

[52] U.S. Cl. .................... 428/195; 428/206; 428/207; 428/210; 428/327; 428/331; 428/340; 428/500; 428/913

[58] Field of Search ............... 428/195, 204, 207, 340, 428/484, 522, 913; 430/138, 253; 346/135.1; 156/234

[56] References Cited

U.S. PATENT DOCUMENTS

| | | | |
|---|---|---|---|
| 4,326,005 | 4/1982 | Reed et al. | 428/201 |
| 4,617,239 | 10/1986 | Maruyama et al. | 428/511 |
| 4,778,711 | 10/1988 | Hosomura et al. | 428/511 |
| 4,910,070 | 3/1990 | Al'Hariri | 428/181 |
| 5,071,823 | 12/1991 | Matsushita et al. | 428/195 |

*Primary Examiner*—Patrick J. Ryan
*Assistant Examiner*—William A. Krynski
*Attorney, Agent, or Firm*—Millen, White, Zelano, & Branigan

[57] ABSTRACT

An ink fusion transfer paper having a recording layer comprising at least one layer on a support, this paper being characterized in that the uppermost layer of the recording layer consist of at least 100 parts by weight of a pigment and 10–50 parts by weight of a binder, the layer being applied to one or both sides of the support at a rate of 5–50 g/m, per side in terms of dry solids, 30–100 weight percent of the aforesaid pigment consist of a synthetic silica having a specific surface of 20–600 $m^2/g$, and the 75 degree gloss of the aforesaid uppermost layer of the paper is no less than 50%.

8 Claims, No Drawings

PAPER SUITABLE FOR INK FUSION TRANSFER TYPE THERMAL PRINTER AND COPIERS, AND A MANUFACTURING METHOD THEREOF

FIELD OF THE INVENTION

This invention concerns an ink fusion transfer type of paper, and more specifically, a paper suitable for ink fusion transfer type thermal printers and copiers.

BACKGROUND OF THE INVENTION

Smooth, high grade recording paper which has been treated by a Super Calendar or the like is used in ink fusion transfer type thermal printers or copiers as it is known to give a clear image. This is particularly true if the recording surface has a smoothness of 100 seconds or more. By making the paper smoother so that there is better contact between the paper and the ink ribbon, more ink is transferred to the paper surface. As a result, reproduction of full tone images is improved, however reproduction of half tone images is unsatisfactory.

At present, coated paper having a high smoothness and gloss is generally not used in ink fusion transfer type thermal printers and copiers. The reason for this is that although the paper is extremely smooth so that there is uniform contact with the ink ribbon, which might be expected to give a good ink copy, transfer of ink actually takes place unevenly and image reproduction is poor.

Non-uniform transfer of ink is particularly evident in the case of smooth, high gloss art paper for printing and in the case of cast-coated paper. This is due to the fact that, as there are very few surface imperfections or cavities, molten ink does not easily stay on the paper and may be retransferred from the paper back to the ink ribbon.

Therefore, although coated paper for printing is designed to be adequate for ordinary printing applications, it is not suitable for ink fusion transfer type thermal printers and copiers.

If these problems inherent in coated printing paper could be resolved, it would be possible to use it for such printers and copiers, and images of higher quality than ever before might be obtained.

In general, in order to confer high surface smoothness on coated paper, the surface is flattened under high pressure using a Super Calendar or similar device. This paper is not as tough as high grade paper, and since it is very dense, it lacks the feeling of volume. In addition, the paper has a low gloss so that there is a very poor balance with the gloss of the image area, and a high image quality comparable to that of ordinary offset printing cannot be obtained.

The Inventors, after performing various studies aimed at resolving the aforesaid problems, found that by incorporating a minimum amount of a synthetic silica having a predetermined specific surface in the paper, good results could be achieved with coated paper manufactured by cast coating.

SUMMARY OF THE INVENTION

It is therefore an object of this invention to provide a coated paper which not only gives excellent image reproduction when used in ink fusion transfer type thermal printers and copiers, but which also has a high gloss in both the non-image and image parts.

It is a further object of this invention to provide a method of manufacturing a coated paper that can be used in ink fusion transfer type thermal printing applications.

The aforesaid objectives of the invention are attained by an ink fusion transfer paper having a recording layer comprising at least one layer on a support, this paper being characterized in that the uppermost layer of the recording layer consists of at least 100 parts by weight of a pigment and 10–50 parts by weight of a binder, the layer being applied to one or both sides of the support at a rate of 5–50 $g/m^2$ per side in terms of dry solids, 30–100 weight percent of the aforesaid pigment consists of a synthetic silica having a specific surface of 20–600 $m^2/g$, and the 75 degree gloss of the aforesaid uppermost layer of the paper is no less than 50%.

DETAILED DESCRIPTION OF THE INVENTION

The synthetic silica used in this invention is generally referred to as non-crystalline silica, amorphous silica, anhydrous silicic acid, hydrated silicic acid, finely powdered silica or white carbon. Its structure is based on a Si-O net, and it is a silicic acid with no fixed crystalline form. From the viewpoint of transferability of molten ink, it is preferable that the synthetic silica used should have a specific surface of 20–600 $m^2/g$ and particularly preferable that it lies within the range 20–300 $m^2/g$. If the specific surface is greater than 600 $m^2/g$ or less than 20 $m^2/g$, the reproducibility of half tone images declines although the reason for this is unclear.

The synthetic silica used in this invention may be prepared by the wet method, dry method or aerogel method, there being no particular limitation on the method of preparation.

In this invention, the blending proportion of synthetic silica in the coating solution is 30–100 parts by weight with respect to 100 parts of pigment. If this blending proportion is less than 30 parts by weight (i.e. less than 30 weight %), transfer of molten ink to the recording layer is unsatisfactory and reproducibility of half tone images is particularly impaired.

There is no particular limitation on the type of pigment that can be used together with the aforesaid synthetic silica. Examples of suitable pigments are inorganic pigments, e.g. kaolin, clay, heavy calcium carbonate, light calcium carbonate, aluminum hydroxide, satin white, titanium dioxide, fired clay, zinc oxide, barium sulfate, talc, and colloidal silica, and organic pigments, e.g. fine particles of styrene resins such as polystyrene or polymethylstyrene, fine particles of acrylic resins such as polymethylmethacrylate and polyacrylonitrile, and fine particles of polyvinyl chloride or polycarbonates. These pigments may also be used in conjunction with each other in any desired proportion.

Of the organic pigments, fine particles of styrene resins, acrylic resins or styrene-acrylic copolymer resins are preferable from the viewpoint of hardness, elasticity and heat resistance. In particular, if fine hollow particles of polystyrene or styrene-methylmethacrylate copolymer are used, it is easier to achieve smoothness of the coated surface and the density of the coated layer can be effectively reduced.

The binder may be a resin, emulsion, latex or natural high polymer which gives a strong adhesion between the pigment and raw paper, and which does not cause blocking between papers or between the paper and ink ribbon, these materials being used either alone or in conjunction with one another.

Examples of such binders are polyvinyl alcohol or starches such as starch oxide, starch esters, enzyme-modified starch and cationic starch, casein, soy proteins, fiber derivatives such as carboxymethyl cellulose and hydroxyethyl cellulose, styrene-acrylic resins, styrene-butadiene resins, vinyl acetate resins and acrylic resins.

The blending proportion of the binder in the coating solution composition is preferably 10–50 parts by weight with respect to 100 part by weight of pigment. If the blending proportion of binder is less than 10 parts by weight, the strength of the coating film declines, and if the proportion is greater than 50 parts by weight, the properties of the coating are adversely affected.

In this invention, dyes or colored pigments may also be added to adjust color, and fluorescent dyes may be added to improve visual whiteness.

The coating containing the aforesaid components may easily be prepared by any of the methods known in the art. In this invention, additives such as dispersing agents, antifoaming agents, release agents, pH regulating agents, lubricants, water retention agents and preservatives may also be added to the aforesaid coating to the extent that they do not impair the advantage of the invention.

In this invention, the coating solution prepared as described hereintofore is coated on a support to be used as a recording layer. If the surface of paper coated with this solution is simply smoothed by Super Calendar (Tokkai-sho(nonexamined published Japanese patent application) 62-198876), however, the paper is not tough enough, sufficient paper gloss is not obtained, and it is difficult to transport the paper inside the printer or copier due to the paper's lack of toughness. Further, transferability of ink declines so that a good image is not obtained, and the balance between the gloss of the paper in the image and non-image parts is extremely poor.

If a coated layer is formed by cast coating the aforesaid coating solution on the paper, on the other hand, paper strength is not impaired, extremely high paper gloss is achieved and the thermal transfer paper of this invention is easily obtained, although no definite reasons for this have been given.

The specific surface of the pigment used in paper coatings is generally 2–3 $g/m^2$ and no greater than 10 $m^2/g$. On the other hand, the specific surface of the synthetic silica used in this invention is 20–600 $m^2/g$. This is far greater than that of pigments commonly used, and it leads to the following inferences.

In a coated layer produced by cast coating, the synthetic silica of high specific surface is incorporated in the recording layer without undergoing any modification which thus gives rise to a very large number of cavities. It may be conjectured that this results in better transferability of ink, absorption of molten ink by the cavities so that image surface imperfections are reduced, and reduction of surface scattering reflections so that image gloss is heightened.

A single or multiple coating is applied by either an on-line or an off-line coater to one or both sides of the paper such that the dry weight of coating on each side is 5–50 $g/m^2$, and preferably 8–30 $g/m^2$. If the amount of coating is less than 5 $g/m^2$, the film on the surface of the raw paper is insufficient so that a high paper gloss cannot be obtained, while if it is greater than 50 $g/m^2$, the paper density increases so that it becomes less tough, paper transport is problematic and the paper loses its function as a printing and copying paper.

The cast coating method used may be any suitable method known in the art such as solidification, rewetting or wetting, providing using a casting drum having a mirror surface.

There is no particular limitation on the coating technique employed to obtain the recorded layer, it being possible to use any ordinary coating technique such as blade coating, roller coating, air knife coating and bar coating.

The solidifying agent used in cast coating by solidification is commonly formic acid, acetic acid, succinic acid, tartaric acid, lactic acid, hydrochloric acid, calcium, zinc, barium, lead, magnesium, cadmium or aluminum sulfates, potassium sulfate, potassium succinate, borax or boric acid, however this invention is not limited to only these substances. Further, the choice of a suitable binder which solidifies well together with these solidifying agents is effective in improving coating speed and the finish of the coated surface.

The raw paper may be an acid or neutral high or medium grade paper. For coating purposes, however, it is preferable that the paper be prepared by known methods of raw paper blending, preparation and manufacture (Tokkai Sho 55-47385).

As described hereintofore, the ink fusion transfer paper of this invention has an extremely high gloss, allows good ink transfer and gives an excellent image gloss. It therefore offers a good paper/image gloss balance, a high quality image, and is particularly suitable as a paper for ink fusion transfer type thermal printers and copiers.

EXAMPLES

This invention will now be described in more detail by means of the following examples, but it is to be understood that it is not limited by them in any way. All parts given in the examples are parts by weight.

The measurements in the examples were performed as follows:

(1) Density: Measured according to the method of JIS P8118.

Measured according to the method of JIS P8119.

(3) Gloss: The 75° gloss of the coated surface was measured according to the method of JIS P8142.

(4) Image gloss: Patterns having a half tone dot surface proportion of 25%, 50% and 100% respectively were recorded using a Mitsubishi Color Thermal Printer M4234-10, and the gloss of each pattern was measured.

(5) Image reproducibility test: Ink transfer performance in the 25% half tone dot pattern was judged visually.

If the pattern was uniformly recorded, it was graded by "○+, if some parts were missing it was graded by "Δ", and if practically no ink had been transferred it was graded by "×".

(6) Coating strength: Using an IGT Print Suitability Tester (IGT A-1type machine manufactured by IGT K.K.), an ink tack of 10, ink volume of 0.025 cc and print speed of 1.2 m/sec, patterns where none of the ink that had been transferred came off were graded by "○", patterns where some of the ink came off were graded by "Δ" and patterns where all the ink came off were graded by "×".

EXAMPLE 1

10 parts heavy calcium carbonate, 1 part cationic starch and 0.1 parts of a sizing agent (alkyl ketene dimer) were blended with 100 parts of a bleached broadleaf tree craftpulp slurry of beating degree 400 cc (L-BKP) so as to make a raw paper of weighting 92 g/m$^2$.

A coating solution containing 43% dry solids was also prepared from 80 parts synthetic silica (commercial name: Syloid 404, Fuji Davison K.K., specific surface 300 m$^2$/g) and 20 parts primary grade kaolin (commercial name: Ultrawhite 90, E.M.C. K.K.) as pigments, 5 parts styrene butadiene latex and 5 parts casein as binders, and 2 parts calcium stearate as a release agent.

After applying the coating solution obtained to the aforesaid raw paper by means of a roll coater at a rate of 10 g/m$^2$ in terms of dry solids, the coating was solidified using a 10% aqueous solution of zinc formate as solidifying agent, and while the coating film was still wet, it was dried in pressure contact with a casting drum having a mirror surface heated to 100° C. An ink fusion transfer thermal paper of weighting 102 g/m$^2$ was thus obtained.

A coating solution containing 42% dry solids was prepared from 80 parts synthetic silica (commercial name: Syloid 404, Fuji Davison K.K., specific surface 300 m$^2$/g) and 20 parts primary grade kaolin (commercial name: Ultrawhite 90, manufactured by E.M.C. K.K.) as pigments, 15 parts styrene butadiene latex and 15 parts casein as binders, and 2 parts calcium stearate as a release agent.

The coating solution obtained was applied to the raw paper of Example 1 (92 g/m$^2$) by means of a roll coater in the same manner as that of Example 1, excepting that the application rate was 15 g/m$^2$ in terms of dry solids. An ink fusion transfer thermal paper of weighting 107 g/m$^2$ was thus obtained.

EXAMPLE 3

A coating solution containing 46% dry solids was prepared from 100 parts synthetic silica (commercial name: Mizukasil P-527, Mizusawa Industrial Chemicals K.K., specific surface 30 (m$^2$/g) as a pigment, 20 parts styrene butadiene latex and 20 parts casein as binders, and 2 parts calcium stearate as a release agent.

The coating solution obtained was applied to the raw paper of Example 1 by means of a roll coater such that the application rate was 10 g/m$^2$ in terms of dry solids in the same manner as that of Example 1. An ink fusion transfer thermal paper of weighting 102 g/m$^2$ was thus obtained.

EXAMPLE 4

The synthetic silica used in Example 3 was replaced by a pigment having a specific surface of 600 m$^2$/g (commercial name: Syloid 600, Fuji Davison K.K.), 23 parts styrene butadiene latex and 20 parts casein added as binders, then 2 parts calcium stearate added as a release agent so as to obtain a coating solution containing 40% solids. The coating solution obtained was applied to the raw paper of Example 1 by means of a roll coater in the same manner as that of Example 1 excepting that the application rate was 5 g/m$^2$ in terms of dry solids.

An ink fusion transfer thermal paper of weighting 97 g/m$^2$ was thus obtained.

EXAMPLE 5

A coating solution containing 54% dry solids was prepared from 30 parts synthetic silica (commercial name: Syloid 404, Fuji Davison K.K., specific surface 300 m$^2$/g), 40 parts primary grade kaolin (commercial name: Ultrawhite 90, E.M.C. K.K.) and 30 parts calcium carbonate (commercial name: Brilliant 15, Shiraishi K.K.) as pigments, 15 parts styrene butadiene latex and 10 parts casein as binders, and 2 parts calcium stearate as a release agent.

The coating solution obtained was applied to the raw paper of Example 1 (92 g/m$^2$) by means of a roll coater in the same manner as that of Example 1, excepting that the application rate was 12 g/m$^2$ in terms of dry solids. An ink fusion transfer thermal paper of weighting 104 g/m$^2$ was thus obtained.

EXAMPLE 6

10 parts heavy calcium carbonate, 1 part cationic starch and 0.1 parts of a sizing agent (alkyl ketene dimer) were blended with 100 parts of a bleached broadleaf tree craftpulp slurry of beating degree 400 cc (L-BKP) so as to make a raw paper of weighting 69 g/m$^2$.

A coating solution containing 55% dry solids was also prepared from 30 parts synthetic silica (commercial name: Syloid 404, Fuji Davison K.K., specific surface 300 m$^2$/g) 40 parts primary grade kaolin (commercial name: Ultrawhite 90, E.M.C. K.K.) and 20 parts calcium carbonate (commercial name: Brilliant 15, Shiraishi K.K.) as pigments together with 10 parts of an organic pigment (commercial name: Boncoat PP-1100, Dai Nippon Kagaku K.K.), 15 parts styrene butadiene latex and 15 parts casein as binders, and 2 parts calcium stearate as a release agent.

The coating solution obtained was applied to the aforesaid raw paper by means of a roll coater as in Example 1, excepting that the rate of application was 40 g/m$^2$ in terms of dry solids. An ink fusion transfer thermal paper of weighting 109 g/m$^2$ was thus obtained.

COMPARATIVE EXAMPLE 1

A coating solution was applied to a raw paper by means of a roll coater exactly as in Example 1, excepting that the application rate was 3.5 g/m$^2$ in terms of dry solids. An ink fusion transfer thermal paper of weighting 95.5 g/m$^2$ was thus obtained.

COMPARATIVE EXAMPLE 2

A coating solution was prepared exactly as in Example 5 excepting that 2 parts butadiene styrene latex and 2 parts casein were used as binders, and 2 parts calcium stearate was used as a release agent. The resulting solution contained 50% of dry solids. This coating solution was applied to the raw paper of Example 1 by means of a roll coater exactly as in Example 1, excepting that the rate of application was 12 g/m$^2$ in terms of dry solids. An ink fusion transfer thermal paper of weighting 104 g/m$^2$ was thus obtained.

COMPARATIVE EXAMPLE 3

A coating solution was prepared exactly as in Example 5 excepting that 30 parts butadiene styrene latex and 30 parts casein were used as binders, and 2 parts calcium stearate was used as a release agent. The resulting solution contained 50% of dry solids. This coating solution was applied to the raw paper of Example 1 by means of a roll coater exactly as in Example 1, excepting that the rate of application was 20 g/m$^2$ in terms of dry solids. An ink fusion transfer thermal paper of weighting 112 g/m$^2$ was thus obtained.

A coating solution containing 58% dry solids was prepared from 5 parts synthetic silica (commercial name: Syloid 404, Fuji Davison K.K., specific surface 300 $m^2/g$), 40 parts primary grade kaolin (commercial name: Ultrawhite 90, E.M.C. K.K.) and 55 parts calcium carbonate (commercial name: Brilliant 15, Shiraishi K.K.) as pigments, 15 parts styrene butadiene latex and 10 parts casein as binders, and 2 parts calcium stearate as a release agent.

This coating solution was applied to the raw paper of EXAMPLE 1 by means of a roll coater exactly as in EXAMPLE 1, excepting that the rate of application was 15 $g/m^2$ in terms of dry solids. An ink fusion transfer thermal paper of weighting 107 $g/m^2$ was thus obtained.

A coating solution containing 58% dry solids was prepared from 25 parts synthetic silica (commercial name: Syloid 404, Fuji Davison K.K., specific surface 300 $m^2/g$), 40 parts primary grade kaolin (commercial name: Ultrawhite 90, E.M.C. K.K.) and 35 parts calcium carbonate (commercial name: Brilliant 15, Shiraishi K.K.) as pigments, 15 parts styrene butadiene latex and 15 parts casein as binders, and 2 parts calcium stearate as a release agent.

This coating solution was applied to the raw paper of Example 1 by means of a roll coater exactly as in Example 1, excepting that the rate of application was 15 $g/m^2$ in terms of dry solids. An ink fusion transfer thermal paper of weighting 107 $g/m^2$ was thus obtained.

COMPARATIVE EXAMPLE 6

A coating solution was applied to a raw paper by means of a roll coater exactly as in Example 1, excepting that the application rate was 60 $g/m^2$ in terms of dry solids. An ink fusion transfer thermal paper of weighting 129 $g/m^2$ was thus obtained.

COMPARATIVE EXAMPLE 7

A coating solution containing 60% dry solids was prepared from 30 parts synthetic silica (commercial name: FK 700, Degusa K.K., specific surface 700 $m^2/g$), 40 parts primary grade kaolin (commercial name: Ultrawhite 90, E.M.C. K.K.) and 30 parts calcium carbonate (commercial name: Brilliant 15, Shiraishi K.K.) as pigments, 11 parts styrene butadiene latex and 11 parts casein as binders, and 2 parts calcium stearate as a release agent.

This coating solution was applied to the raw paper of Example 1 by means of a roll coater exactly as in Example 1, excepting that the rate of application was 11 $g/m^2$ in terms of dry solids. An ink fusion transfer thermal paper of weighting 103 $g/m^2$ was thus obtained.

COMPARATIVE EXAMPLE 8

A coating solution containing 56% dry solids was prepared from 30 parts synthetic silica (commercial name: Syloid 404, Fuji Davison K.K., specific surface 300 $m^2/g$) and 70 parts calcium carbonate (commercial name: Brilliant 15, Shiraishi K.K. ) as pigments, and 22 parts styrene butadiene latex and 2 parts starch oxide as binders.

This coating solution was applied to the raw paper of Example 1 by means of a roll coater such that the rate of application was 10 $g/m^2$, and dried to give a coated paper of weighting 102 $g/m^2$. The coated surface was then smoothed by means of a Super Calendar so as to obtain an ink fusion transfer thermal paper.

Coating solution compositions, specific surfaces of synthetic silica and coating amounts used for each of the ink fusion transfer thermal papers in the aforesaid Examples and Comparative Examples are summarized in Table 1. In this Table, the figures in the pigment column represent the ratios synthetic silica/kaolin/calcium carbonate/organic pigment, and the figure in the binder column represents the ratio latex/casein.

TABLE 1

| | Coating Solution | | Specific Surface of Synthetic | Application Rate |
|---|---|---|---|---|
| | Pigment | Binder | Silica ($m^2/g$) | ($g/m^2$) |
| Example | | | | |
| 1 | 80/20/0/0 | 5/5 | 300 | 10 |
| 2 | 80/20/0/0 | 15/15 | 300 | 15 |
| 3 | 100/0/0/0 | 20/20 | 30 | 10 |
| 4 | 100/0/0/0 | 23/20 | 600 | 5 |
| 5 | 30/40/30/0 | 15/10 | 300 | 12 |
| 6 | 30/40/20/10 | 15/15 | 300 | 40 |
| Comparative Example | | | | |
| 1 | 80/20/0/0 | 15/15 | 300 | 3.5 |
| 2 | 30/40/30/0 | 2/2 | 300 | 12 |
| 3 | 30/40/30/0 | 30/30 | 300 | 20 |
| 4 | 5/40/55/0 | 15/10 | 300 | 15 |
| 5 | 25/40/35/0 | 15/15 | 300 | 15 |
| 6 | 30/40/20/10 | 15/15 | 300 | 60 |
| 7 | 30/40/30/0 | 11/11 | 700 | 11 |
| 8 | 30/0/70/0 | 22/0 | 300 | 10 |

Paper quality test results and image quality test results for the coated papers obtained as described heretofore are given in Table 2.

The results shown in Table 2 confirm not only that the ink fusion transfer thermal paper of this invention has a high paper gloss, is tough and of extremely high quality, but also that images recorded on this paper have a high gloss and that the quality of these images is excellent.

TABLE 2

| | Density ($g/cm^3$) | Smoothness (second) | Gross Degree (%) 19 | Image Gross (%) Half Tone Dot Surface Proportion (%) 25 | 50 | 100 | Image Reproducibility | Strength of Coating Layer |
|---|---|---|---|---|---|---|---|---|
| Example | | | | | | | | |
| 1 | 0.89 | 500 | 60 | 70 | 81 | 92 | O | O |
| 2 | 0.90 | 520 | 62 | 72 | 81 | 91 | O | O |
| 3 | 0.91 | 630 | 55 | 65 | 74 | 93 | O | O |
| 4 | 0.89 | 550 | 53 | 63 | 73 | 91 | O | O |
| 5 | 0.91 | 2500 | 73 | 83 | 88 | 92 | O | O |
| 6 | 0.87 | 1900 | 71 | 83 | 85 | 94 | O | O |
| Comparative Example | | | | | | | | |
| 1 | 0.86 | 170 | 30 | 25 | 32 | 70 | X | O |
| 2 | 0.89 | 300 | 50 | 40 | 73 | 83 | X | X |

TABLE 2-continued

| | Density | Smoothness | Gross Degree | Image Gross (%) Half Tone Dot Surface Proportion (%) | | | Image | Strength of |
|---|---|---|---|---|---|---|---|---|
| | (g/cm$^3$) | (second) | (%) 19 | 25 | 50 | 100 | Reproducibility | Coating Layer |
| 3 | 0.91 | 300 | 80 | 80 | 83 | 85 | X | ○ |
| 4 | 0.91 | 3900 | 85 | 85 | 86 | 88 | X | ○ |
| 5 | 0.90 | 2200 | 75 | 75 | 86 | 88 | Δ | ○ |
| 6 | 0.98 | 2300 | 78 | 76 | 85 | 80 | ○ | Δ |
| 7 | 0.91 | 2600 | 54 | 54 | 60 | 75 | Δ | ○ |
| 8 | 1.29 | 1200 | 28 | 33 | 56 | 66 | X | ○ |

What is claimed is:

1. An ink fusion transfer paper comprising at least one recording layer which comprises at least one layer, on a support, this paper being characterized in that the uppermost layer of the recording layer consists of at least 100 parts by weight of a pigment and 10–50 parts by weight of a binder, the layer being applied by a cast coating method to one or both sides of the support at a rate of 5–50 g/m$^2$ per side in terms of dry solids, 30–100 weight percent of the aforesaid pigment consist of a synthetic silica having a specific surface of 20–600 m$^2$/g, and the 75 degree gloss of the paper is no less than 50%.

2. An ink fusion transfer paper claimed in claim 1, wherein at least one organic pigment selected from a group consisting of fine particles of styrene resins, acrylic resins and styrene-acrylic copolymer resins is used as the pigment in addition to the synthetic silica.

3. An ink fusion transfer paper claimed in claim 2, wherein said organic pigment is a fine hollow particles of polystyrene or styrene-methylmethacrylate copolymer.

4. An ink fusion transfer paper claimed in claim 1, wherein the binding agent is an at least one selecting from a group consisting of a polyvinylalcohol, starches, casein, soy protein, fiber derivatives, styrene-acrylic resins, styrene-butadiene resins, vinyl acetate resins and acrylic resins.

5. An ink fusion transfer paper claimed in claim 4, wherein the starches consist of a starch oxide, a starch ester, an enzymemodified starch or a cationic starch and the fiber derivatives consist of a carboxymethylcellulose or hydroxyethyl cellulose.

6. An ink fusion transfer paper claimed in claim 1, wherein at least one additives selected from a group consisting of dyes and colored pigments is further contained in the uppermost layer.

7. An ink fusion transfer paper claimed in claim 1, wherein at least one fluorescent dyes is further contained in the uppermost layer.

8. An ink fusion transfer paper claimed in claim 1, wherein the uppermost layer is of the recording layer is applied to one or both sides of the support at a rate of 8–30g/m$^2$ per side in terms of dry solids.

* * * * *